(12) United States Patent
Huang et al.

(10) Patent No.: US 11,270,179 B2
(45) Date of Patent: Mar. 8, 2022

(54) SYSTEM AND METHOD FOR MANAGING CONTAINERS

(71) Applicant: EVERGREEN MARINE CORPORATION (TAIWAN) LTD., Taipei (TW)

(72) Inventors: Chao-Kuo Huang, Taipei (TW); Meng-Chuan Tsai, Taipei (TW)

(73) Assignee: EVERGREEN MARINE CORPORATION 9TAIWAN) LTD., Taipei (TW)

( * ) Notice: Subject to any disclaimer, the term of this patent is extended or adjusted under 35 U.S.C. 154(b) by 0 days.

(21) Appl. No.: 17/142,997

(22) Filed: Jan. 6, 2021

(65) Prior Publication Data

US 2021/0326667 A1 Oct. 21, 2021

(30) Foreign Application Priority Data

Apr. 17, 2020 (TW) .................................. 109113026

(51) Int. Cl.
*G06K 19/07* (2006.01)
*G06K 19/06* (2006.01)
*B65D 81/05* (2006.01)

(52) U.S. Cl.
CPC ......... *G06K 19/0719* (2013.01); *B65D 81/05* (2013.01); *G06K 19/06028* (2013.01); *G06K 19/06112* (2013.01); *B65D 2203/045* (2013.01); *B65D 2203/06* (2013.01)

(58) Field of Classification Search
CPC ......... G06K 19/0719; G06K 19/06028; G06K 19/06112; B65D 2203/045; B65D 2203/06; B65D 81/05
See application file for complete search history.

(56) References Cited

U.S. PATENT DOCUMENTS

| | | | |
|---|---|---|---|
| 2005/0278062 A1* | 12/2005 | Janert | G06Q 10/08 700/214 |
| 2006/0271234 A1* | 11/2006 | Gaug | G06Q 10/109 700/213 |
| 2009/0322510 A1* | 12/2009 | Berger | G06Q 10/0833 340/539.1 |
| 2013/0186962 A1* | 7/2013 | Kennett | G06K 1/128 235/494 |
| 2015/0006378 A1* | 1/2015 | Blythe | G06K 19/0716 705/41 |
| 2017/0124671 A1* | 5/2017 | Tam | G06Q 20/047 |
| 2017/0322090 A1* | 11/2017 | Jones | G01K 1/022 |

(Continued)

*Primary Examiner* — Daniel I Walsh
(74) *Attorney, Agent, or Firm* — Hamre, Schumann, Mueller & Larson, P.C.

(57) ABSTRACT

A system for managing containers includes a server, a portable electronic device and a check apparatus. The server stores a piece of transaction data. The portable electronic device is configured to receive the piece of transaction data from the server, to determine whether a shaking criterion is met based on acceleration of the portable electronic device, and to display a barcode corresponding to the piece of transaction data when the shaking criterion is met. The portable electronic device is further configured to capture an image and send the image to the server. The check apparatus is configured to read and decode the barcode, and to display information relating to the piece of transaction data based on data encoded in the barcode.

10 Claims, 3 Drawing Sheets

(56) References Cited

U.S. PATENT DOCUMENTS

| | | | |
|---|---|---|---|
| 2018/0224150 A1* | 8/2018 | Lewis | F25D 29/008 |
| 2019/0197466 A1* | 6/2019 | Hand, III | G06K 9/00624 |
| 2019/0277552 A1* | 9/2019 | Vu | F25D 23/025 |
| 2020/0073399 A1* | 3/2020 | Tateno | G05D 1/0274 |
| 2020/0074356 A1* | 3/2020 | Tseng | G07D 7/0043 |
| 2020/0107663 A1* | 4/2020 | Eivaz | A47G 29/20 |
| 2020/0254619 A1* | 8/2020 | Grundfest | G05D 1/0038 |
| 2020/0387863 A1* | 12/2020 | Ruth | G06Q 10/087 |
| 2021/0132625 A1* | 5/2021 | Gillett | B62D 63/025 |
| 2021/0192428 A1* | 6/2021 | Heikkila | G01H 17/00 |
| 2021/0248338 A1* | 8/2021 | Spivack | G06K 7/10831 |
| 2021/0326828 A1* | 10/2021 | Enatsu | G06Q 20/209 |

\* cited by examiner

SYSTEM AND METHOD FOR MANAGING CONTAINERS

CROSS-REFERENCE TO RELATED APPLICATION

This application claims priority of Taiwanese Invention Patent Application No. 109113026, filed on Apr. 17, 2020.

FIELD

The disclosure relates to container management, and more particularly to a system and a method for managing containers.

BACKGROUND

A conventional method for transporting shipping containers to or from a container yard relies heavily on paper documents. For example, one who intends to transport a shipping container to or from a container yard by a container truck (e.g., a driver of the truck) has to deliver relevant paper document(s) to an employee of the container yard for verification before loading the container onto the truck or unloading the container from the truck. However, such conventional method involving the handling of paper documents lacks time efficiency, and is troublesome because paper documents are easy to be mixed up or lost.

SUMMARY

Therefore, an object of the disclosure is to provide a system and a method for managing containers that can alleviate at least one of the drawbacks of the prior art.

According to one aspect of the disclosure, a system for managing containers includes a server, a portable electronic device and a check apparatus. The server is configured to store a piece of transaction data that is related to a delivery of a container. The portable electronic device is configured to communicate with the server to receive the piece of transaction data therefrom, and includes a camera, an accelerometer, a first display, and a first processor that is electrically connected to the camera, the accelerometer and the first display. The first processor is configured to, after receiving the piece of transaction data from the server, obtain acceleration data relating to acceleration of the portable electronic device through the accelerometer. The first processor is configured to determine whether a shaking criterion is met based on the acceleration data thus obtained. When it is determined that the shaking criterion is met, the first processor is configured to control the first display to display a barcode corresponding to the piece of transaction data, to control the camera to capture an image, and to send the image thus captured to the server for storage therein. The check apparatus includes a barcode reader, a second display, and a second processor that is electrically connected to the barcode reader and the second display. The barcode reader is configured to read the barcode displayed on the first display. The second processor is configured to decode the barcode and to control the second display to display information relating to the piece of transaction data based on data encoded in the barcode.

According to one aspect of the disclosure, a method for managing containers is to be performed by a portable electronic device that includes a first processor, an accelerometer, a first display and a camera. The portable electronic device communicates with a server storing a piece of transaction data that is related to a delivery of a container. The method includes steps of: receiving, by the first processor, the piece of transaction data from the server; after receiving the piece of transaction data, obtaining, by the first processor, acceleration data that relates to acceleration of the portable electronic device through the accelerometer; determining, by the first processor, whether a shaking criterion is met based on the acceleration data thus obtained; when it is determined that the shaking criterion is met, controlling, by the first processor, the first display to display a barcode that corresponds to the piece of transaction data; controlling, by the first processor, the camera to capture an image; and sending, by the first processor, the image to the server for storage therein.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
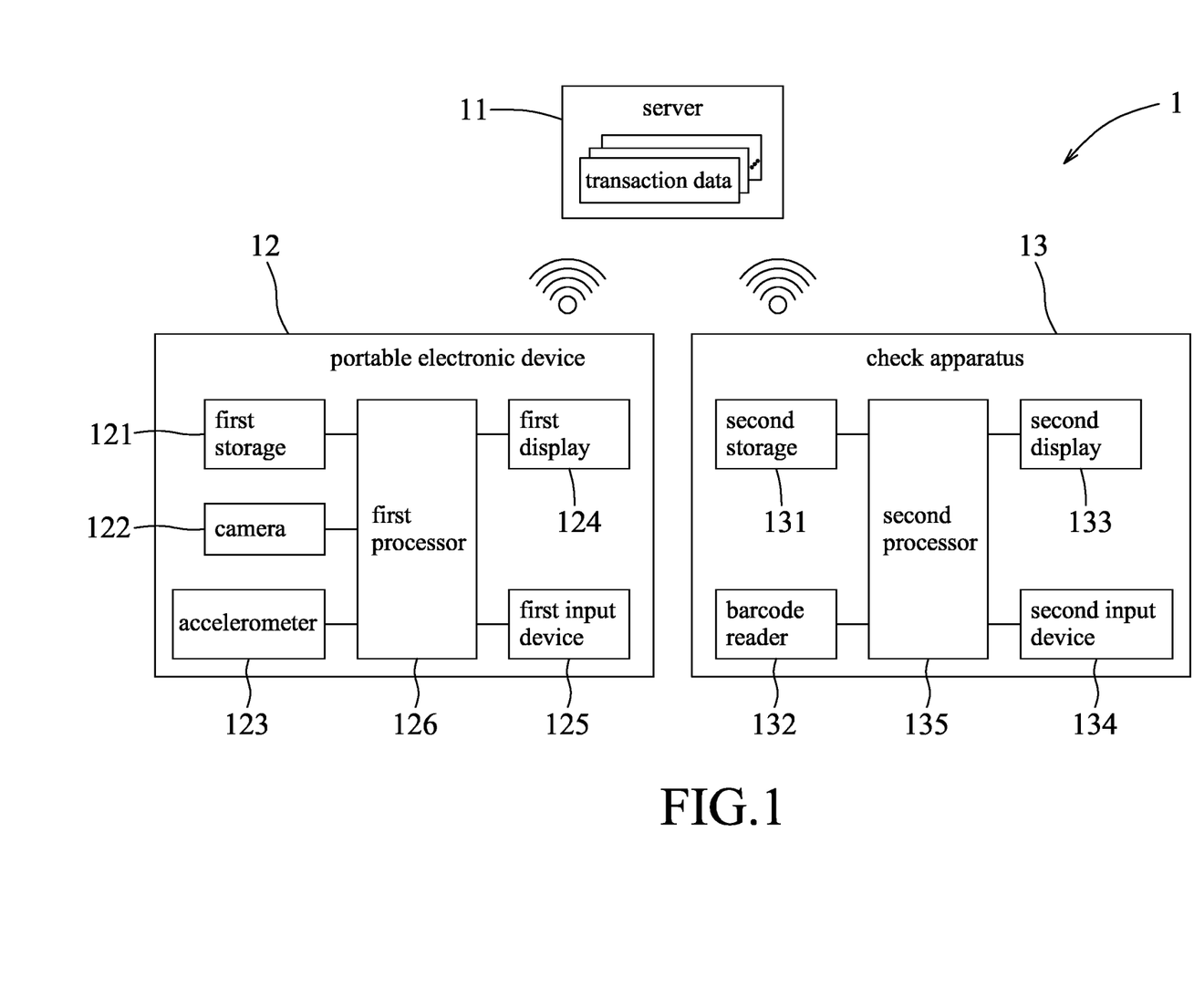
FIG. 1 is a block diagram that exemplarily illustrates a system for managing containers according to an embodiment of the disclosure.

FIG. 1 exemplarily illustrates a system 1 for managing containers (e.g., shipping containers) according to an embodiment of the disclosure. The system 1 includes a server 11, and a portable electronic device 12 and a check apparatus 13 that are configured communication. According to an embodiment, the server 11 may be maintained by a freight company, and may be implemented by, for example a server appliance. According to some embodiments, the portable electronic device 12 is possessed by an employee of the freight company who may be a driver of a container truck (i.e., the delivery man), and may be implemented by, for example, a smart phone or a tablet computer. According to some embodiments, the check apparatus 13 is located at a container yard to be operated and managed by an employee of the container yard, and maybe implemented by, for example, a smart phone, a tablet computer or a personal computer (PC). In practice, the system 1 may include more than one portable electronic device 12 possessed respectively by more than one delivery man and more than one check apparatus 13 respectively located at more than one container yard, but FIG. 1 only illustrates one portable electronic device 12 and one check apparatus 13, and the following description only focuses on one particular portable electronic device 12 and one particular check apparatus 13 for the sake of brevity.

The server 11 is configured to store multiple pieces of transaction data that each have a unique identifier, and that are each related to a respective delivery of a respective container to or from a corresponding container yard. Each of the multiple pieces of transaction data is initially stored in the server 11 with a tag indicating a pending state, and the tag will be changed to indicating a finished state after the related delivery is completed. The pending state means that the delivery of the container related to the piece of transaction data has not been completed yet, and the finished state means that the delivery of the container related to the piece of transaction data is completed. According to some embodiments of the disclosure, each of the multiple pieces of transaction data may be established, for example, by an employee of the freight company maintaining the server 11 through operating the server 11 or a computer device in communication with the server 11.

According to some embodiments of the disclosure, a delivery is associated with a handover task which may be an empty-export-container-pick-up task, a full-export-container-receiving task, a full-import-container-delivery task, an empty-container-return task, an empty-container-dispatch task, or a full-container-dispatch task, but the disclosure is not limited thereto. Specifically, the empty-export-container-pick-up task is initiated by a shipper and is to deliver an empty container from a container yard to a stuffing location in order for said container to be stuffed with goods; the full-export-container-receiving task is to deliver a full container already stuffed at a stuffing location to a marine terminal in order for said container to be exported; the full-import-container-delivery task is to deliver an imported full container that is loaded with goods from a container yard to an unloading location in association with a consignee or a receiver in order for the consignee or the receiver to conduct unstuffing of said container; the empty-container-return task is to deliver a container that has been unstaffed at an unloading location (i.e., an empty container) from said unloading location to a container yard for storage therein; the empty-container-dispatch task is to deliver an empty container from a container terminal or an inland container depot (ICD) to another container terminal or another ICD for storage therein; the full-container-dispatch task is to deliver a full container from a container terminal or an ICD to another container terminal or another ICD for transshipment. It should be noted that "an empty container" refers to a container that contains no cargo inside (that is, no cargo is loaded in the container), and "a full container" refers to a container that has been at least partially stuffed with goods (that is, the container is loaded with goods).

The information contained in the pieces of transaction data may vary depending on the handover tasks associated with the deliveries related to the pieces of transaction data. According to some embodiments of the disclosure, a piece of transaction data that is related to a delivery associated with the empty-export-container-pick-up task may contain information indicating, for example, a name of a vessel (e.g., a ship), a voyage number, a booking number, a shipping order number (S/O number) (also known as local document number), a discharging port, a name of a shipper (e.g., an owner of goods to be stuffed into the container(s)), a container type, a number (quantity) of container(s), a name of a truck dispatch company, a license plate number, and/or an identifier of a receiver (e.g., a name of the receiver), but the disclosure is not limited thereto.

According to some embodiments of the disclosure, a piece of transaction data that is related to a delivery associated with the full-export-container-receiving task may contain information indicating, for example, a container number, an equipment interchange receipt (EIR), a container loading plan, a name of a truck dispatch company, and/or a license plate number, but the disclosure is not limited thereto.

According to some embodiments of the disclosure, a piece of transaction data that is related to a delivery associated with the full-import-container-delivery task may contain information indicating, for example, a Bill of Lading number, a release number, a name of a consignee, an identifier of a receiver (e.g., a name of the receiver), a name of a truck dispatch company, a license plate number, whether container with a particular container number has been designated to be delivered, and/or a container number, but the disclosure is not limited thereto.

According to some embodiments of the disclosure, a piece of transaction data that is related to a delivery associated with the empty-container-return task may contain information indicating, for example, a container number, an EIR, a name of a truck dispatch company, and/or a license plate number, but the disclosure is not limited thereto.

According to some embodiments of the disclosure, a piece of transaction data that is related to an empty-container-dispatch task may contain information indicating, for example, a reposition (RPO) number, a departure location, a destination location, a name of a carrier (e.g., a vessel company), a container type, a quantity of container(s), a name of a truck dispatch company, a license plate number, and/or an identifier of a receiver (e.g., a name of a receiver), but the disclosure is not limited thereto.

According to some embodiments of the disclosure, a piece of transaction data that is related to the full-container-dispatch task may contain information indicating, for example, a name of a vessel, a voyage number, a name of a shipping company, a destination, a name of a truck dispatch company, a license plate number, an identifier of a receiver (e.g., a name of the receiver), whether container with a particular container number has been designated to be delivered, and/or a container number, but the disclosure is not limited thereto.

As illustrated in FIG. 1, the portable electronic device 12 includes a first storage 121, a camera 122, an accelerometer 123, a first display 124, a first input device 125, and a first processor 126 that is electrically connected with the first storage 121, the camera 122, the accelerometer 123, the first display 124 and the first input device 125. According to some embodiments, the first storage 121 may be implemented by a memory device, such as random access memory (RAM), read only memory (ROM), programmable ROM (PROM), firmware, flash memory, etc. According to some embodiments, the accelerometer 123 may be implemented by a gravity sensor (also known as G-sensor), and the first display 124 and the first input device 125 may be collectively implemented by a touch screen, but the disclosure is not limited thereto. According to an embodiment, the first processor 126 is configured to communicate with the server 11 when executing a first application stored in the first storage 121. For example, the first processor 126 includes, but not limited to, one or more of a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

As illustrated in FIG. 1, the check apparatus 13 includes a second storage 131, a barcode reader 132, a second display 133, a second input device 134, and a second processor 135 that is electrically connected with the second storage 131, the barcode reader 132, the second display 133 and the second input device 134. According to some embodiments, the second storage 131 may be implemented by a memory device such as random access memory (RAM), read only memory (ROM), programmable ROM (PROM), firmware, flash memory, etc. In an embodiment where the check apparatus 13 is a PC, the second display 133 is implemented by a monitor, and the second input device 134 is implemented by a computer mouse and a computer keyboard, but the disclosure is not limited thereto. In some embodiments where the check apparatus 13 is a smart phone or a tablet computer, the second display 133 and the second input device 134 are collectively implemented by a touch screen, and the barcode reader 132 is implemented by a camera of the smart phone and an application that is stored in the second storage 131 and that may be executed by the second processor 135 to decode a barcode from an image captured by said camera, but the disclosure is not limited thereto. According to an embodiment, the second processor 135 is configured to communicate with the server 11 when executing a second application stored in the second storage 131. For example, the second processor 135 includes, but not limited to, one or more of a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 2:
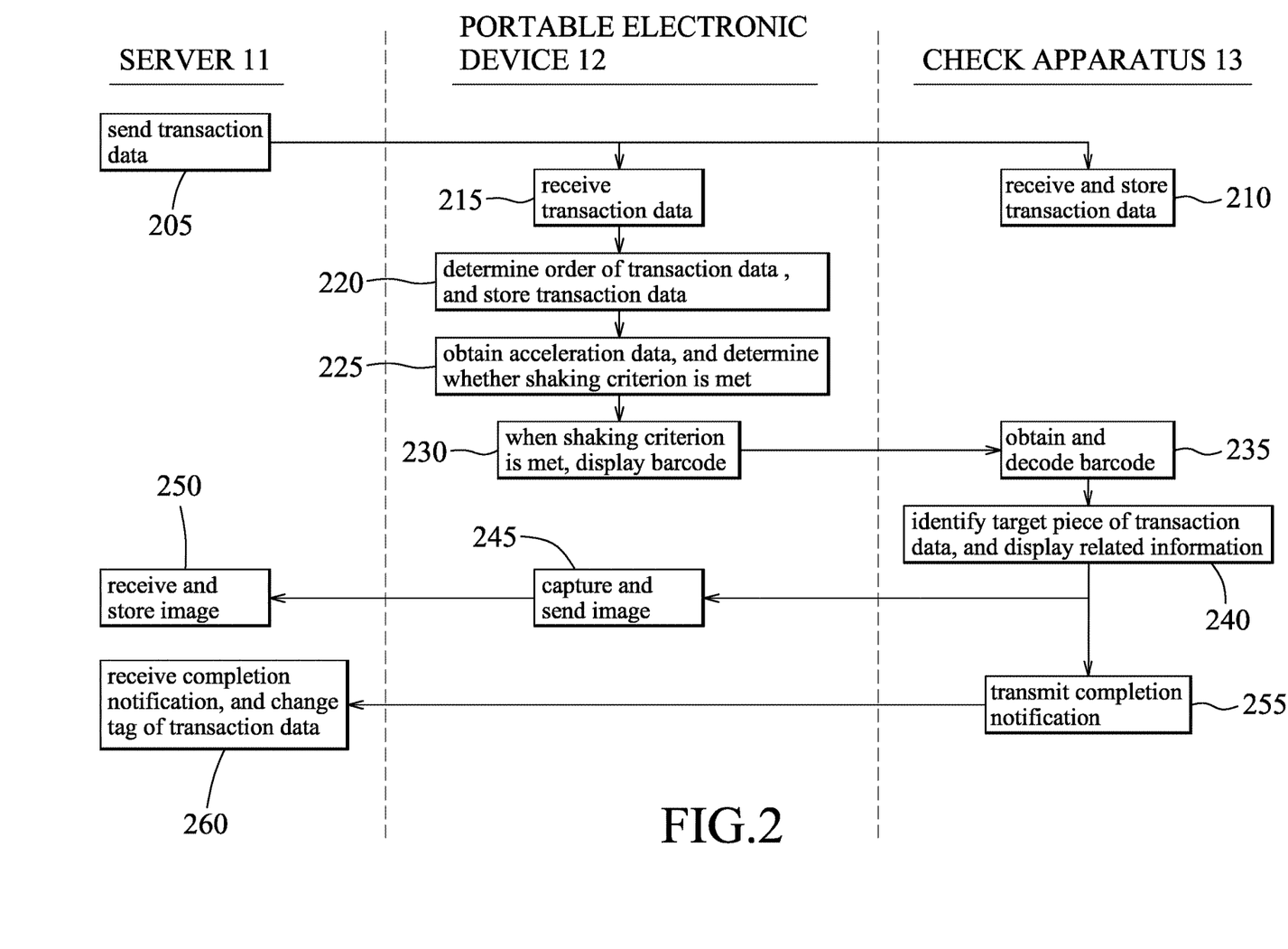
FIG. 2 is a flow chart that exemplarily illustrates a method for managing containers according to an embodiment of the disclosure.

FIG. 2 illustrates a method for managing containers, especially for managing handover of containers to/from the container yard where the check apparatus 13 is located. Referring to FIG. 2, the method includes the following steps that are performed by the server 11, the portable electronic device 12 and the check apparatus 13 of the system 1.

In Step 205, the server 11 sends a first subset of the multiple pieces of transaction data stored therein to the portable electronic device 12, and sends a second subset of the multiple pieces of transaction data to the check apparatus 13. The first subset includes at least one piece of transaction data related respectively to at least one delivery that is assigned to a user of the portable electronic device 12, wherein the user may be, e.g., a driver of a container truck that is going to be used for said at least one delivery. The second subset includes at least one piece of transaction data that is related respectively to at least one delivery, each of which is to transport a container to/from the container yard where the check apparatus 13 is located.

According to some embodiments, the first subset may be sent by the server 11 to the portable electronic device 12 based on a near-end operation or a remote-end operation of a user (e.g., an employee of the freight company maintaining the server 11, or an employee of a truck dispatch company collaborating with the freight company), and the piece(s) of transaction data included in the first subset may be sent to the portable electronic device 12 one by one or in a batch, but the disclosure is not limited thereto.

According to some embodiments, the second subset may be sent automatically by the server 11 to the check apparatus 13 at a predetermined time point every day, but the disclosure is not limited thereto. For example, the server 11 may automatically send any piece of transaction data associated with the container yard that has been established (e.g., during a current day or a day before that day) and that has not been sent to the check apparatus 13 at, e.g., eight o'clock in the morning every day. In this way, prearrangement of workflow, human resources or other affairs (e.g., routes of incoming trucks) of the container yard may be facilitated.

In Step 210, the check apparatus 13 receives the second subset of the pieces of transaction data from the server 11, and stores the same in the second storage 131.

On the other hand, in Step 215, the portable electronic device 12 receives the first subset of the pieces of transaction data from the server 11.

In Step 220, the portable electronic device 12 (specifically, the first processor 126) determines a particular order of the pieces of transaction data in the first subset, and stores the first subset of the pieces of transaction data in the first storage 121.

In an embodiment, each piece of transaction data received by the portable electronic device 12 from the server 11 contains at least a designated execution time at which a delivery of a container related to the piece of transaction data should be conducted, and the particular order is determined based on the designated execution time(s) of the piece(s) of transaction data included in the first subset. In another embodiment, the particular order is determined based on time(s) at which the portable electronic device 12 received the piece(s) of transaction data included in the first subset respectively. However, the disclosure is not limited to these embodiments. According to an embodiment, once the particular order is determined and the first subset of the pieces of transaction data is stored in the first storage 121, the portable electronic device 12 may display, on the first display 124, a list of the delivery/deliveries related to the first subset of the pieces of transaction data in accordance with the particular order for review by the user of the portable electronic device 12. Therefore, the user of the portable electronic device 12 may conduct the delivery/deliveries related to the first subset of the pieces of transaction data according to the particular order.

Next, Step 225 is performed by the portable electronic device 12 to proceed to a handover of a container when the user of the portable electronic device 12 arrives at a container yard that is associated with a delivery of the container related to a first one of the piece(s) of transaction data in the first subset (also referred to as "priority piece of transaction data" hereinafter) that has a highest priority in the particular order among the pieces of transaction data in the first subset of. Briefly speaking, when arriving at the container yard, the user of the portable electronic device 12 may trigger the portable electronic device 12 to display a barcode corresponding to the priority piece of transaction data (Step 230) by, for example, shaking the portable electronic device 12 when the first application is being executed on the portable electronic device 12, in order for a user of the check apparatus 13 (e.g., a staff member of the container yard) located at said container yard to conduct a checking procedure associated with said handover.

Specifically, in Step 225, the first processor 126 of the portable electronic device 12 obtains acceleration data relating to acceleration of the portable electronic device 12 through the accelerometer 123, and determines whether a shaking criterion is met based on the acceleration data thus obtained by, for example, executing the first application stored in the first storage 121.

In Step 230, when it is determined that the shaking criterion is met, the first processor 126 controls the first display 124 to display a barcode corresponding to the priority piece of transaction data. According to some embodiments of the disclosure, the shaking criterion may be an acceleration variation of the portable electronic device 12 as indicated by the acceleration data exceeding a predetermined threshold, which may be, for example, $10 \text{ m/s}^2$.

Figure 3:
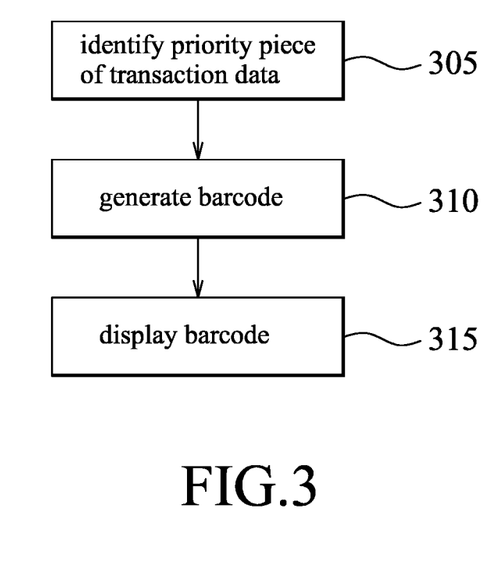
FIG. 3 exemplarily illustrates sub-steps of Step 230 of FIG. 2 according to an embodiment of the disclosure.

According to some embodiments of the disclosure, Step 230 may include Sub-steps 305, 310 and 315 as illustrated in FIG. 3. In Sub-step 305, the first processor 126 first identifies the priority piece of transaction data from among the pieces of transaction data of the first subset. Next, in Sub-step 310, the first processor 126 generates the barcode representing the unique identifier of the priority piece of transaction data. According to a non-limitative embodiment, the barcode maybe generated further based on a unique device identifier of the portable electronic device 12. Then, in Sub-step 315, the first processor 126 controls the first display 124 to display the barcode.

However, the disclosure is not limited to the procedure illustrated in FIG. 3. For example, in an embodiment of the disclosure, the first processor 126 pre-generates, for each piece of transaction data in the first subset, a corresponding barcode upon receiving the piece of transaction data from the server 11 (e.g., in Step 215 or Step 220). In another embodiment of the disclosure, the barcode is generated by the server 11, and is sent along with the priority piece of transaction data (e.g., being included in the priority piece of transaction data) to the portable electronic device 12.

According to a non-limitative embodiment of the disclosure where the barcode is generated by the first processor 126, the barcode displayed on the first display 124 may be time-limited for the sake of data security. That is, the barcode will expire a certain time period (e.g., three minutes) after being displayed on the first display 124, and will no longer be valid after its expiration. However, the user of the portable electronic device 12 may operate the portable electronic device 12 through the first input device 125 to generate a new barcode to be displayed on the first display 124 after the original barcode has expired if needed.

Referring back to FIG. 2, Step 235 is performed after the barcode has been displayed on the first display 124 of the portable electronic device 12. At this stage, the user of the check apparatus 13 may operate the check apparatus 13 to read the barcode on the first display 124 to conduct the checking procedure.

Specifically, in Step 235, the second processor 135 of the check apparatus 13 obtains the barcode that represents the identifier of the priority piece of transaction data through the barcode reader 132 reading the barcode displayed on the first display 124 of the portable electronic device 12, and decodes the barcode to obtain the identifier of the priority piece of transaction data.

Next, in Step 240, based on the identifier thus obtained, the second processor 135 identifies a target one of the pieces of transaction data (also referred to as "target piece of transaction data" hereinafter) among the pieces of transaction data in the second subset and stored in the second storage 131 (the identifier of the target piece of transaction data is the same as the identifier thus obtained), and then the second processor 135 controls the second display 133 to display information relating to the target piece of transaction data in order for the user of the check apparatus 13 to review the information.

After the information related to the target piece of transaction data is displayed on the second display 133, the handover of the container that is associated with the delivery which is related to the target piece of transaction data is allowed, and the user of the portable electronic device 12 may proceed to load/unload the container onto/from a container truck that the user of the portable electronic device 12 has taken or driven to the container yard according to the handover task associated with said delivery. In order to complete the handover, the user of the portable electronic device 12 may operate the portable electronic device 12 to capture an image as proof.

Specifically, in Step 245, the first processor 126 of the portable electronic device 12 controls the camera 122 to capture an image (e.g., a photo) in response to receiving a user input inputted by the user of the portable electronic device 12 through the first input device 125, and sends the image to the server 11. For example, when the delivery is associated with the empty-export-container-pick-up task, the image captured in Step 245 may be a photo of an exterior of the container (which is empty) and the photo exhibits information of the container such as the container type, the container number, etc. Moreover, when the associated handover task is the full-export-container-receiving task, the image maybe a photo of certified document(s) such as an EIR, an Export Goods Warehoused Voucher, etc.

In Step 250, the server 11 receives the image from the portable electronic device 12, and stores the image, e.g., in association with the piece of transaction that is stored therein and that corresponds to the priority/target piece of transaction data.

After said handover is completed, the user of the check apparatus 13 may operate the check apparatus 13 to send a notification to the server 11 in order for the server 11 to update its stored data.

Specifically, in Step 255, the check apparatus 13 generates a completion notification corresponding to the target piece of transaction data, and transmits the completion notification thus generated to the server 11. The completion notification is a signal that indicates completion of the handover task associated with the target piece of transaction data. According to an embodiment, the completion notification may be generated in response to receiving a user input inputted by the user of the check apparatus 13 through the second input device 134.

In Step 260, the server 11 receives the completion notification from the check apparatus 13, and responsively changes the tag associated with the piece of transaction data that is stored in the server 11 and that corresponds to the priority/target piece of transaction data. Specifically, in Step 260, the tag is changed to indicating the finished state, instead of the pending state. In an embodiment, the tag is implemented by a bit that may be set to either zero to indicate the pending state or one to indicate the finished state, but the disclosure is not limited thereto.

It can be appreciated that some alterations may be made to the procedure illustrated in FIG. 2. For example, Steps 245 and 250 may be performed before Step 230 when the handover task associated with the priority piece of transaction data is the full-export-container-receiving task and the image to be captured is a photo of an exterior of the container or an Export Goods Warehoused Voucher, because in this situation, the container has been loaded onto the truck, and the Export Goods Warehoused Voucher is accessible by the user of the portable electronic device 12 before the truck and the user of the portable electronic device 12 arrive at the container yard (that is, before the checking procedure at the container yard starts).

According to an embodiment, the first processor 126 of the portable electronic device 12 may delete the priority piece of transaction data from the first subset of the pieces of transaction data stored in the first storage 121, and Steps 225, 230, 235, 240, 245, 250, 255, 260 may be repeated if any piece of transaction data of the first subset is still stored in the first storage 121 after the priority piece of transaction data has been deleted.

It can be appreciated that the disclosed system 1 and method are beneficial in that by using the disclosed system 1 and method, a delivery man (i.e., the user of the portable electronic device 12) and a staff member of a container yard (the user of the check apparatus 13 located at the container yard) may conveniently and rapidly conduct the checking procedure by the delivery man shacking the portable electronic device 12 that is executing the first application in order to generate a barcode to be automatically displayed on the portable electronic device 12 without manual selection of a particular piece of data, and by the staff of the container yard readily accessing the target piece of transaction data by reading the barcode with the check apparatus 13, improving time-efficiency of the checking procedure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for managing containers, comprising:
   a server configured to store multiple pieces of transaction data that are each related to a respective delivery of a container;
   a portable electronic device configured to communicate with said server, and including a camera, an accelerometer, a first display, a storage, and a first processor that is electrically connected to said camera, said accelerometer, said first display and said storage; and
   a check apparatus including a barcode reader, a second display and a second processor that is electrically connected to said barcode reader and said second display;
   wherein said server is further configured to send a first subset of the pieces of transaction data to said portable electronic device, each piece of transaction data in the first subset being related to a delivery that is assigned to a user of said portable electronic device;
   wherein said first processor of said portable electronic device is configured to
      receive the first subset of the pieces of transaction data from said server, and store the same in said storage of said portable electronic device,
      determine a particular order of the pieces of transaction data in the first subset thus received,
      after receiving the first subset of the pieces of transaction data from said server, obtain acceleration data relating to acceleration of said portable electronic device through said accelerometer,
      determine whether a shaking criterion is met based on the acceleration data thus obtained,
      when it is determined that the shaking criterion is met, generate a barcode that corresponds to a first one of the pieces of transaction data, and control said first display to display the barcode, the first one of the pieces of transaction data having a highest priority in the particular order among the pieces of transaction data in the first subset,
      control said camera to capture an image, and
      send the image thus captured to said server for storage therein;
   wherein said check apparatus is configured to
      by said barcode reader, read the barcode displayed on said first display of said portable electronic device, and
      by said second processor, decode the barcode and control said second display to display information relating to the first one of the pieces of transaction data based on data encoded in the barcode.

2. The system of claim 1, wherein:
   the multiple pieces of transaction data each have a unique identifier;
   said server is configured to send a second subset of the pieces of transaction data to said check apparatus for storage therein, each piece of transaction data in the second subset being related to a delivery of a container to a container yard where said check apparatus is located;
   said portable electronic device is configured to, when it is determined that the shaking criterion is met, generate the barcode that corresponds to the first one of the pieces of transaction data by
      identifying the piece of transaction data that has the highest priority in the particular order among the pieces of transaction data in the first subset, and
      generating the barcode representing the identifier of the piece of transaction data that has the highest priority; and
   said second processor of said check apparatus is configured to
      obtain the barcode that represents the identifier of the piece of transaction data having the highest priority through said barcode reader,
      decode the barcode thus obtained to obtain the identifier of the piece of transaction data having the highest priority,
      based on the identifier thus obtained, identify a target one of the pieces of transaction data among the pieces of transaction data in the second subset and stored in said check apparatus, and
      control said second display to display information relating to the target one of the pieces of transaction data thus identified.

3. The system of claim 1, wherein said storage of said portable electronic device stores an application, and said first processor of said portable electronic device is configured, when executing the application, to determine whether the shaking criterion is met by determining whether an acceleration variation indicated by the acceleration data exceeds a threshold.

4. The system of claim 1, wherein:
said second processor of said check apparatus is configured to, after controlling said second display to display the information relating to the first one of the pieces of transaction data, generate a completion notification corresponding to the first one of the pieces of transaction data, and to transmit the completion notification to said server; and
said server is configured to initially store the first one of the pieces of transaction data with a tag that indicates a pending state, and to change the tag to indicating a finished state in response to receiving the completion notification.

5. A method for managing containers to be performed by a portable electronic device that includes a first processor, an accelerometer, a storage, a first display and a camera and that communicates with a server storing multiple pieces of transaction data that are each related to a respective delivery of a container, the method comprising steps of:
by the first processor, receiving a first subset of the pieces of transaction data from the server, each piece of transaction data in the first subset being related to a delivery that is assigned to a user of the portable electronic device;
by the first processor, determining a particular order of the pieces of transaction data in the first subset, and storing the first subset of the pieces of transaction data in the storage of the portable electronic device;
after receiving the first subset of the pieces of transaction data, by the first processor, obtaining acceleration data that relates to acceleration of the portable electronic device through the accelerometer;
by the first processor, determining whether a shaking criterion is met based on the acceleration data thus obtained;
when it is determined that the shaking criterion is met, by the first processor, generating a barcode corresponding to a first one of the pieces of transaction data that has a highest priority in the particular order among the pieces of transaction data in the first subset, and controlling the first display to display the barcode;
by the first processor, controlling the camera to capture an image; and
by the first processor, sending the image to the server for storage therein.

6. The method of claim 5, the multiple pieces of transaction data each having a unique identifier, wherein the step of generating a barcode includes:
identifying the piece of transaction data that has the highest priority in the particular order among the pieces of transaction data in the first subset; and
generating the barcode that represents the identifier of the piece of transaction data that has the highest priority.

7. The method of claim 6, to be performed further by a check apparatus that includes a second processor, a barcode reader, a second display and a storage, the method further comprising steps of:

receiving, by the check apparatus from the server, a second subset of the pieces of transaction data, each piece of transaction data in the second subset being related to a delivery of a container to a container yard where the check apparatus is located;
storing, by the check apparatus, the second subset of the pieces of transaction data thus received in the storage;
obtaining, by the second processor, the barcode that represents the identifier of the piece of transaction data having the highest priority through the barcode reader reading the barcode displayed on the first display of the portable electronic device;
decoding, by the second processor, the barcode to obtain the identifier of the piece of transaction data having the highest priority;
by the second processor based on the identifier thus obtained, identifying a target one of the pieces of transaction data among the pieces of transaction data in the second subset and stored in the storage; and
controlling, by the second processor, the second display to display information that relates to the target one of the pieces of transaction data thus identified.

8. The method of claim 5, the storage of the portable electronic device further storing an application, wherein the step of determining whether a shaking criterion is met includes:
by the first processor, executing the application stored in the storage to determine whether the shaking criterion is met by determining whether an acceleration variation indicated by the acceleration data exceeds a threshold.

9. The method of claim 5, to be performed further by a check apparatus that includes a second processor, a barcode reader and a second display, the method further comprising steps of:
reading, by the barcode reader, the barcode displayed on the first display of the portable electronic device;
decoding, by the second processor, the barcode thus obtained; and
controlling, by the second processor, the second display to display information that relates to the first one of the pieces of transaction data based on data encoded in the barcode.

10. The method of claim 9, further comprising steps of:
by the server, initially storing the first one of the pieces of transaction data with a tag that indicates a pending state;
by the check apparatus after displaying the information that relates to the first one of the pieces of transaction data, generating a completion notification that corresponds to the first one of the pieces of transaction data;
by the check apparatus, transmitting the completion notification thus generated to the server; and
by the server in response to receiving the completion notification, changing the tag associated with the first one of the pieces of transaction data stored in the server to indicating a finished state.

* * * * *

UNITED STATES PATENT AND TRADEMARK OFFICE
CERTIFICATE OF CORRECTION

PATENT NO. : 11,270,179 B2
APPLICATION NO. : 17/142997
DATED : March 8, 2022
INVENTOR(S) : Huang et al.

It is certified that error appears in the above-identified patent and that said Letters Patent is hereby corrected as shown below:

On the Title Page

Item [73], delete "EVERGREEN MARINE CORPORATION 9TAIWAN) LTD.," and insert --EVERGREEN MARINE CORPORATION (TAIWAN) LTD.,--.

Signed and Sealed this
Twenty-first Day of June, 2022

Katherine Kelly Vidal
*Director of the United States Patent and Trademark Office*